Dec. 19, 1922.
L. S. MAEDE.
COFFEE ROASTER.
FILED JUNE 22, 1921.

INVENTOR
LELAND S. MAEDE.
BY Chas. E. Townsend
ATTORNEY.

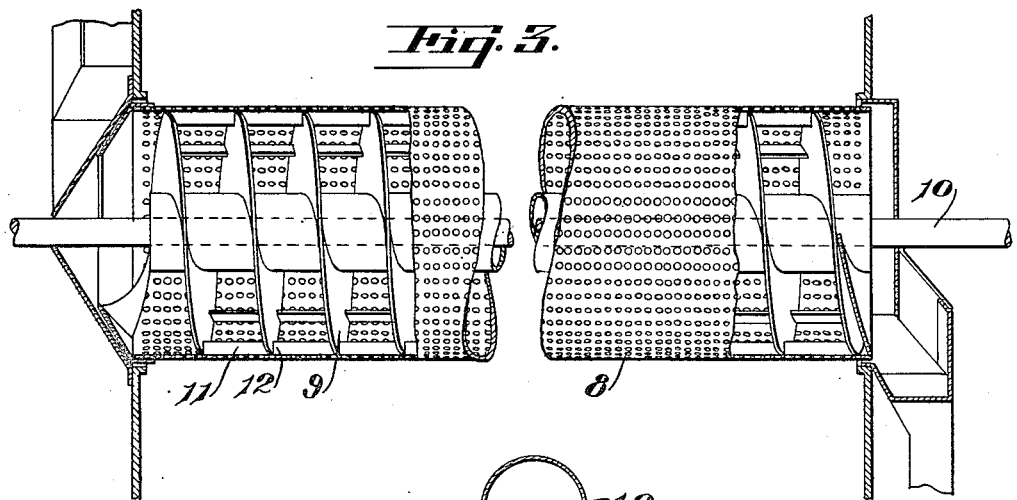
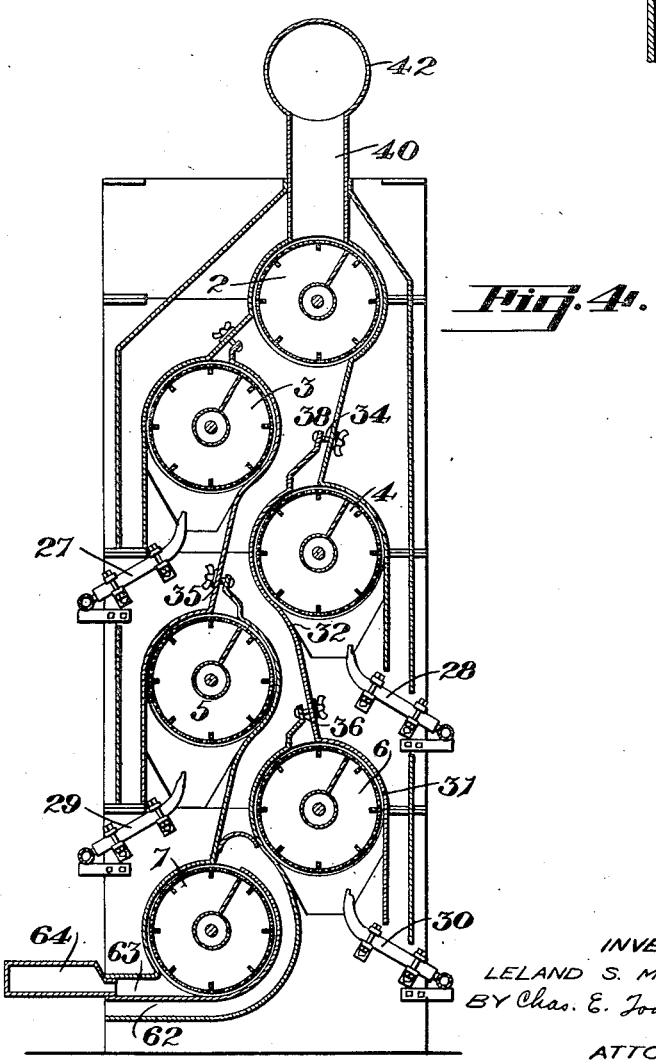

Patented Dec. 19, 1922.

1,439,317

UNITED STATES PATENT OFFICE.

LELAND S. MAEDE, OF SAN FRANCISCO, CALIFORNIA.

COFFEE ROASTER.

Application filed June 22, 1921. Serial No. 479,485.

*To all whom it may concern:*

Be it known that I, LELAND S. MAEDE, a citizen of the United States, residing at the city and county of San Francisco and State of California, have invented new and useful Improvements in Coffee Roasters, of which the following is a specification.

This invention relates to a coffee roaster, and especially to a roaster of the continuous operating type.

One of the objects of the present invention is to generally improve and simplify coffee roasters of the character described, and especially to provide a roaster of the continuously operating type, to which coffee is intermittently and automatically delivered in small batches and each batch separately roasted.

Another object of the invention is to provide means for uniformly heating the coffee during the roasting operation; to provide means for cooling the coffee when the roast is completed, and to provide means for stoning and otherwise removing objectionable matter in the coffee.

Further objects will hereinafter appear.

The invention consists of the parts and the construction, combination and arrangement of parts as hereinafter more fully described and claimed, having reference to the accompanying drawings, in which—

Fig. 3 is an enlarged detail view of one of the roasting cylinders.

Fig. 4 is a central, vertical enlarged cross section taken on line 4—4, Fig. 1.

Figure 1:
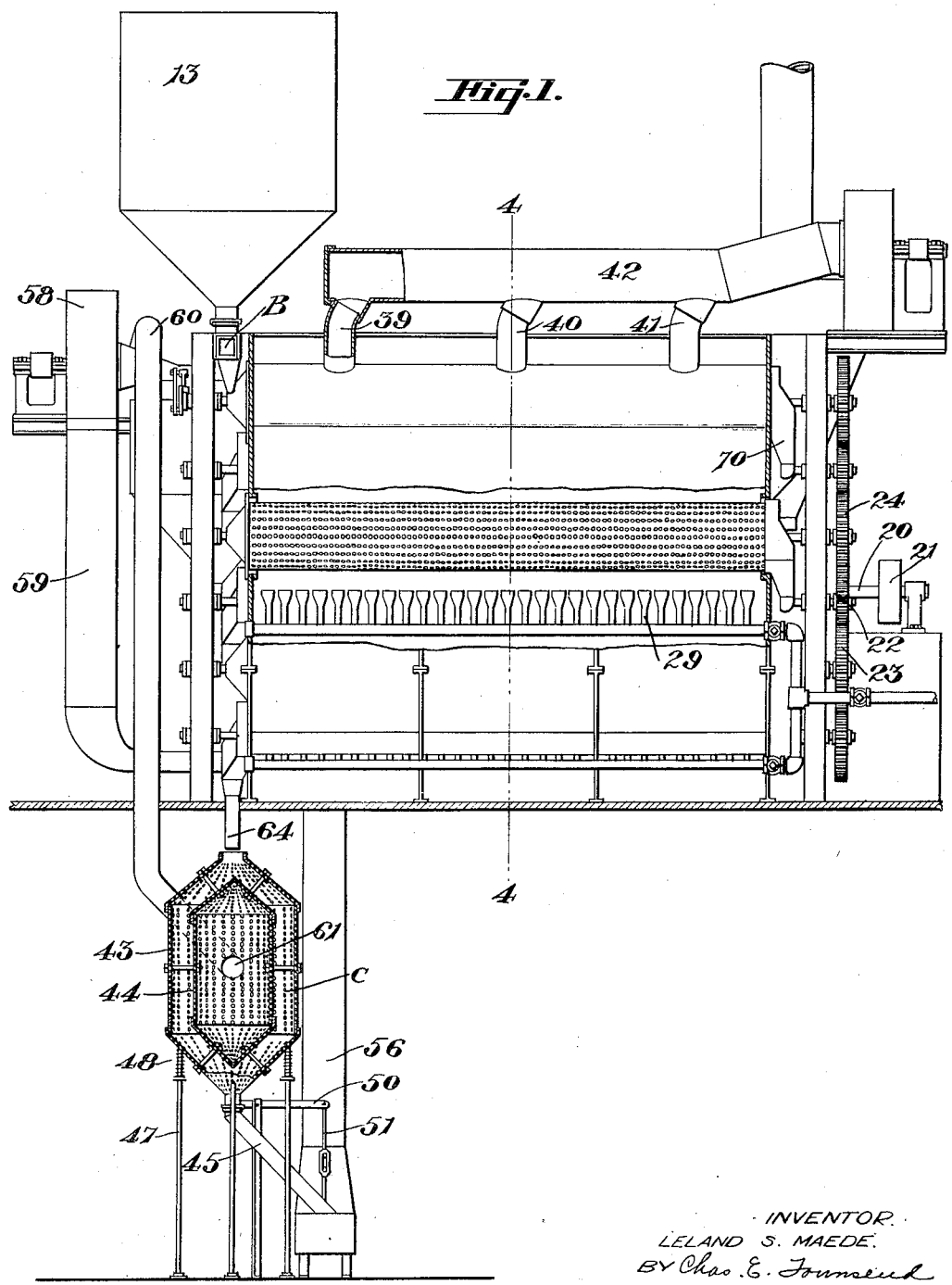
Fig. 1 is a side elevation of the roaster, parts broken away and parts being shown in section.

Referring to the drawings in detail, A indicates in general a rectangular shaped housing in which is supported a plurality of roasting cylinders, generally indicated at 2, 3, 4, 5, 6 and 7. Each cylinder consists of a perforated cylindrical shell 8, interior of which is mounted a continuous helical blade 9; the blade being supported by means of a shaft 10, and as it is desired to rotate the perforated cylinder, the shaft and the helical feeding blade in unison, means are provided for securing these several members as a unit; the means employed being longitudinally extending bars 11, secured to the perforated cylinder and entering the periphery of the helical feeding blade by notching the same as at 12. Each roasting cylinder is identical in construction and the description of one therefore covers all.

The cylinders are disposed one above the other. The coffee is delivered to the uppermost cylinder and is merely subjected to a preliminary heating action while passing therethrough. It is then automatically delivered to the cylinders 3, 4, 5 and 6 where the coffee is subjected to a roasting action and it is finally delivered to the lowermost cylinder 7, where the coffee is cooled as will hereinafter be described. The coffee to be roasted is in this instance deposited in a hopper or container 13, disposed on top of and at one end of the housing A. Mounted directly below the hopper is a plunger feed valve generally indicated at B. This valve is mounted in a cylinder, square in cross section and indicated at 14. The plunger is also square in cross section and is provided with a pocket 15, which extends therethrough. The cylinder 14 is provided with an inlet opening 16, communicating with the hopper 13, and is provided with a discharge opening 17, which communicates with a feed spout 18 through which the coffee is delivered to one end of the uppermost roasting cylinder 2. A reciprocating movement is imparted to the plunger B. The pocket 15 will therefore alternately register with the openings 16 and 17; the pocket becoming filled when registry is made with the hopper connection 16, and the coffee being discharged by gravity from the pocket when registry is made with the feed spout 18. The delivery of coffee to the uppermost cylinder is therefore intermittent and a predetermined quantity or batch of coffee is also insured during each delivery as the pocket 15 has a given capacity and it is completely filled each time registry is made with the hopper 13.

The several roasting cylinders are driven in unison, but in opposite directions with relation to each other, by means of a drive shaft 20 driven from any suitable source or as here shown by means of a pulley 21. A spur gear 22 is secured on this shaft which intermeshes with the gears indicated at 23 and 24. The gears 23 and 24 again intermesh with gears carried by the several shafts whereby the roasting cylinders are supported and a continuous drive is thus transmitted to each roasting cylinder, but in directions opposite to each other; the intermittent or reciprocating movement imparted to the plunger B being transmitted to a crank 25 carried by the uppermost roasting cylinder supporting shaft 10, and a link mechanism generally shown at 26.

For the purpose of supplying heat required for roasting purposes, a series of gas burners have been provided. These burners are indicated at 27, 28, 29 and 30. The burners extend from end to end of the roasting cylinders as shown in Fig. 1 and may be constructed in any suitable manner. By referring to Fig. 4, it will be noted that the burners are only disposed below the cylinders, 3 4, 5 and 6, and that the actual roasting of the coffee therefore only takes place in these cylinders, while preheating takes place in the uppermost cylinder 2 and cooling when the roast has been completed in the lowermost cylinder 7. The cylinder 6 is enclosed on one side by a sheet iron casing generally indicated at 31. This casing is bent to conform to the contour of the cylinder and it is then extended as at 32 and bent to conform to the contour of the cylinder 4. Similar sheets of metal enclose the respective drums. The burners are disposed at the lower ends of the sheets where air to support combustion may be freely admitted, but the sheets are brought together above the drums as indicated at 33, 34, 35 and 36 to permit the products of combustion to discharge into a common centrally disposed flue passage 38. This flue passage delivers all the heated air and products of combustion into the casing surrounding the uppermost roasting cylinder 2 so that the coffee delivered thereto will be preheated before actually entering the roasting cylinders. The casing surrounding the uppermost cylinder terminates in a series of flues indicated at 39, 40 and 41, which in turn connect with a final escape flue 42.

Figure 2:
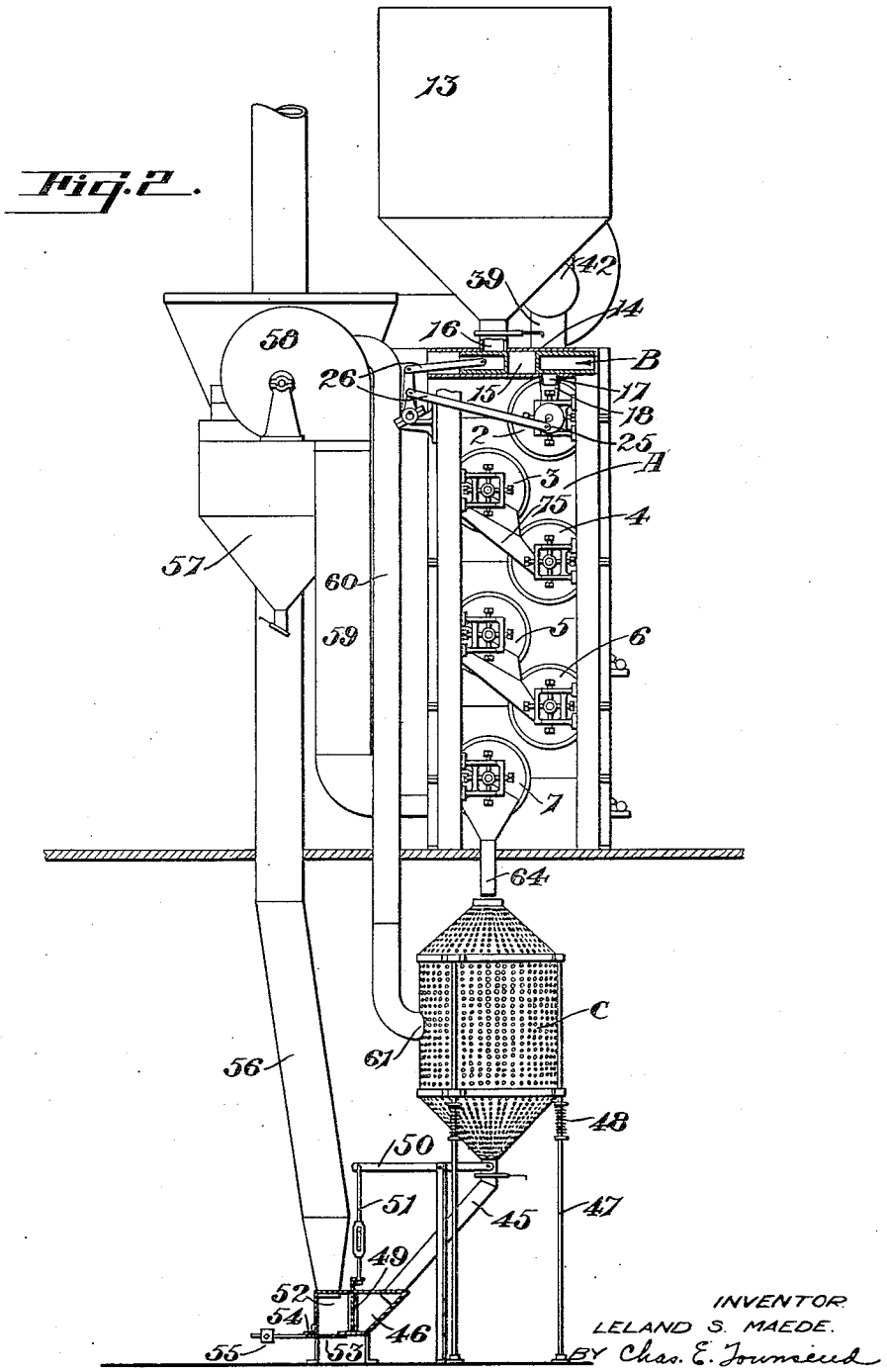
Fig. 2 is an end view of the same.

The coffee that has passed through the several cylinders and the final cooling cylinder 7 is discharged into a perforated hopper generally indicated at C. This hopper consists of two perforated cylinders, one disposed within the other as indicated at 43 and 44. The coffee then discharges into a spout 45, which is connected with a stoning or separating hopper 46. The hopper C is supported by rods 47 and is resiliently supported with relation thereto by means of springs 48. A valve is disposed within the separating hopper 46 as at 49 and this is automatically opened by means of a lever 50 and a link 51 when a predetermined quantity of coffee is collected in the hopper C, that is coffee delivered thereto gradually collects in the discharge spout 45 and in the lower end of the hopper C and finally increases the weight to such an extent that the hopper settles on the rods against the tension of the springs 48. This movement is transmitted through the lever 50 and the link 51 to open the valve 49 and the coffee is thus permitted to enter a separating chamber 52, the bottom of which is closed by means of a perforated door 53, pivotally attached to the casing as at 54 when normally held in closed position against the bottom by means of a weight 55. The upper end of the separating chamber is connected through an elevating pipe 56 with an upper hopper 57. This hopper is in turn connected with the suction side of a blower 58 and the discharge side of the blower is divided into two branches as at 59 and 60. The branch 60 discharges air into the perforated hopper C through the connection indicated at 61, while the branch 59 discharges its air into the lowermost cylinder 7 through a duct 62. This lowermost cylinder is entirely enclosed and the discharge of air and coffee therefrom takes place through the duct 63; this duct being connected with a pipe and spout 64, which discharges into the upper end of the hopper C as indicated in Figs. 1 and 2.

The operation of the roaster as a whole will be as follows:

With power transmitted to the shaft 20, it will be seen that the roasting cylinders will all be continuously rotated and that the direction of rotation will be in opposition to each other; further that a reciprocating movement will be imparted to the plunger B and that predetermined quantities or batches of coffee will therefore be intermittently delivered through the spout 18 into one end of the uppermost cylinder 2. Rotation of the cylinders will cause each batch of coffee delivered to gradually advance to the opposite end where it discharges through a spout 70 into the cylinder 3. The coffee receives a preliminary heating during its passage through the uppermost cylinder and is subjected to a roasting action while travelling through the cylinder 3. The coffee discharges from the opposite side of the cylinder 3 through a spout 75 into the cylinder 4. It travels through this cylinder and discharges therefrom into the cylinder 5. It then travels in a similar manner through the cylinders 5 and 6 and is finally delivered into the cooling cylinder 7 from where it discharges through the spout 64 into the perforated hopper C. The coffee gradually collects in the lower end thereof and in the spout 45, and when the weight become sufficient, valve 49 opens and the coffee will then discharge by gravity into the separating chamber 52. The blower 58 is of course in operation when the roast is going on and air will thus be drawn upwardly through the elevating pipe 56 with great velocity as the suction side of the blower is connected with the hopper 57. The air in order to enter the pipe 56 must pass through the perforated bottom portion 53 of the separating chamber and as the coffee is automatically delivered thereto, it can be seen that the air blast created will pick up the coffee and carry it through the pipe 56 into the hopper 57. Any gravel or other heavy objectional material will in this manner deposit in the separating chamber 52 as the velocity of the air is only sufficient to pick up the lighter coffee beans or particles. The separating chamber may be cleaned from time to time to remove the collected heavy matter by closing the valve 49 and opening the perforated bottom section 53 by merely tilting the weighted lever; this lever automatically closing the door or bottom section and retaining it so closed during general operation.

The air discharge by the blower 58 through the pipe or branch 59, as previously stated, enters the duct 62 formed adjacent the cooling cylinder 7 and then passes through the cylinder 7 and thereby cools the coffee contained therein and passing therethrough. The air finally discharges, together with the coffee, through the duct 63 and the discharge pipe 64; the coffee depositing in the hopper C, while the air escapes therethrough. The second pipe or branch indicated at 60 also connected with the blower, likewise delivers an air blast to the hopper C, thereby further cooling the coffee.

From the foregoing it can be seen, first that a roaster continuous in operation has been provided; secondly that coffee in predetermined quantities or batches is intermittently delivered and is separately roasted as each batch delivered passes through the respective roasting cylinders in separated lots. This is of great importance as I have found by actual experience that a small quantity of coffee can be more easily handled and uniformly roasted than where large quantities or volumes are being treated. A better roast and a more uniform product is obtained when the coffee is roasted in small batches and this is one of the main features sought by the present invention. Third, preliminary heating of the coffee is obtained; roasting to any degree desired, which is regulated by the burners shown, and efficient and rapid cooling is obtained when the roast has been completed, first, by passing the coffee through the cylinder 7, and secondly, through the hopper C and the separating chamber 52. Fourth, stoning or separation of objectional matter is automatically accomplished and the quality and general appearance is thus further improved. Fifth; comparatively little attention is required once the roaster has been set in operation and the burners regulated, as the coffee is automatically delivered and fed through the several roasting cylinders, and finally cooled, cleaned and delivered to the hopper 57; the coffee being removed from the hopper 57 by any suitable means or in any manner desired.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. A coffee roaster comprising a plurality of continuously rotating cylinders, means for feeding coffee to the first thereof, means for advancing the coffee through all of the cylinders, and means associated with said cylinders whereby the coffee will be preheated, roasted and cooled upon completion of its travel through the cylinders.

2. A coffee roaster comprising a plurality of continuously rotating cylinders, means for intermittently feeding a predetermined amount of coffee to the first of said cylinders, means for advancing said coffee through all of the cylinders, and means associated with the cylinders whereby the coffee will be preheated, roasted and cooled upon the completion of its travel through the cylinders.

3. A coffee roaster comprising a plurality of continuously rotating cylinders, means for intermittently feeding a predetermined amount of coffee to the first of said cylinders, means for advancing said coffee through all of the cylinders, means associated with the cylinders whereby the coffee will be preheated, roasted and cooled upon the completion of its travel through the cylinders, and a separator operatively connected to the last of said cylinders.

4. A coffee roaster comprising a preheating cylinder, means for delivering coffee thereto, a plurality of roasting cylinders, a cooling cylinder, means for advancing the coffee successively through said cylinders, heating means associated with the roasting cylinders, and means for aerating the coffee as it passes through the cooling cylinder.

5. In a coffee roaster a coffee receiving hopper, an elongated cylinder mounted adjacent the same, means for rotating the cylinder, feed means adapted to advance coffee from end to end of the cylinder, a casing disposed below the hopper, an inlet and a discharge opening formed in the casing, and offset with relation to each other, a connection between the hopper and the inlet opening, a connection between the discharge opening and one end of the roasting cylinder, a plunger slidably mounted in the casing, a pocket formed in said plunger, and means for transmitting a reciprocating movement to the plunger to intermittently bring the pocket in the plunger into register with the inlet and discharge openings formed in the casing.

6. In a roaster a plurality of rotating elongated cylinders, means for delivering coffee to one of the cylinders and advancing it therethrough and then through the successive cylinders, means for preheating of the coffee in the first cylinder and roasting of the coffee in the succeeding cylinders, and means for cooling the coffee when roasted.

7. In a roaster a plurality of rotating elongated cylinders, means for delivering coffee to one of the cylinders and advancing it therethrough and then through the successive cylinders, means for preheating of the coffee in the first cylinder and roasting of the coffee in the succeeding cylinders, a cooling cylinder adapted to receive the coffee when roasted, and means for directing a blast of cold air through said cylinder.

8. In a coffee roaster a plurality of superposed cylinders, means for rotating said cylinders in unison, but in opposition to each other, means for delivering coffee to the uppermost cylinder, coffee feeding means in each cylinder, means for transferring the coffee from one cylinder to another, burners disposed below certain cylinders to permit roasting of the coffee when fed through the cylinders, means for directing the heat of said burners to the uppermost cylinder to preheat the coffee when passing therethrough and before delivering the coffee to the roasting cylinders, a cooling cylinder disposed below the roasting cylinders, a perforated hopper disposed at one end thereof, a discharge spout connecting the cooling cylinder with said hopper and means for directing a cooling air blast through the cylinder and through the discharge spout into the hopper.

9. In a coffee roaster a plurality of superposed cylinders, means for rotating said cylinders in unison, but in opposition to each other, means for delivering coffee to the uppermost cylinder, coffee feeding means in each cylinder, means for transferring the coffee from one cylinder to another, burners disposed below certain cylinders to permit roasting of the coffee when fed through the cylinders, means for directing the heat of said burners to the uppermost cylinder to preheat the coffee when passing therethrough and before delivering the coffee to the roasting cylinders, a cooling cylinder disposed below the roasting cylinders, a perforated hopper disposed at one end thereof, a discharge spout connecting the cooling cylinder with said hopper, means for directing a cooling air blast through the cylinder and through the discharge spout into the hopper, a separator disposed below the hopper, means for automatically discharging coffee from the hopper into the separator, and means for directing an air blast through the separator.

10. In a coffee roaster a plurality of superposed cylinders, means for rotating said cylinders in unison, but in opposition to each other, means for delivering coffee to the uppermost cylinder, coffee feeding means in each cylinder, means for transferring the coffee from one cylinder to another, burners disposed below certain cylinders to permit roasting of the coffee when fed through the cylinders, means for directing the heat of said burners to the uppermost cylinder to preheat the coffee when passing therethrough and before delivering the coffee to the roasting cylinders, a cooling cylinder disposed below the roasting cylinders, a perforated hopper disposed at one end thereof, a discharge spout connecting the cooling cylinder with said hopper, means for directing a cooling air blast through the cylinder and through the discharge spout into the hopper, a separator disposed below the hopper, means for automatically discharging coffee from the hopper into the separator, means for directing an air blast through the separator, a second receiving hopper disposed above the separator, and a tube connecting the separator with said second named hopper to permit the coffee to be elevated to the secondary hopper by means of the air blast directed through the separator.

11. A coffee roaster comprising a preheating cylinder, means for delivering coffee thereto, a plurality of roasting cylinders, a cooling cylinder, means for advancing the coffee successively through said cylinders, heating means associated with the roasting cylinders, means for aerating the coffee as it passes through the cooling cylinder, and a separator adapted to receive the coffee from the cooling cylinder.

12. A coffee roaster comprising a preheating chamber, a plurality of roasting chambers, a cooling chamber, means for feeding coffee to the first named chamber, means for advancing the coffee through all of the chambers in successive order, heating means associated with the preheating and the roasting chambers, and means for aerating the coffee in the cooling chamber.

LELAND S. MAEDE.